(12) United States Patent
Bar et al.

(10) Patent No.: US 11,427,072 B2
(45) Date of Patent: *Aug. 30, 2022

(54) FUEL FILLER DEVICE

(71) Applicant: ILLINOIS TOOL WORKS INC., Glenview, IL (US)

(72) Inventors: Jean-Philippe Bar, Berneuil en Bray (FR); Matthias Kapaun, Gaukoenigshofen (DE)

(73) Assignee: Illinois Tool Works Inc., Glenview, IL (US)

( * ) Notice: Subject to any disclaimer, the term of this patent is extended or adjusted under 35 U.S.C. 154(b) by 89 days.

This patent is subject to a terminal disclaimer.

(21) Appl. No.: 16/266,901

(22) Filed: Feb. 4, 2019

(65) Prior Publication Data

US 2019/0241064 A1 Aug. 8, 2019

Related U.S. Application Data

(63) Continuation of application No. 14/440,883, filed as application No. PCT/US2013/070412 on Nov. 15, 2013, now Pat. No. 10,195,934.

(30) Foreign Application Priority Data

Nov. 16, 2012 (DE) ..................... 10 2012 022 393.5

(51) Int. Cl.
*B60K 15/04* (2006.01)
*B60K 15/035* (2006.01)
(Continued)

(52) U.S. Cl.
CPC ........ *B60K 15/04* (2013.01); *B60K 15/03519* (2013.01); *B60K 15/05* (2013.01);
(Continued)

(58) Field of Classification Search
CPC .. B60K 15/04; B60K 15/05; B60K 15/03519; B60K 15/035; B60K 15/0403;
(Continued)

(56) References Cited

U.S. PATENT DOCUMENTS

| 4,966,299 | A | | 10/1990 | Teets et al. |
| 5,730,194 | A | * | 3/1998 | Foltz ...................... B60K 15/04 |
| | | | | 137/588 |

(Continued)

FOREIGN PATENT DOCUMENTS

| EP | 1329353 A1 | 7/2003 |
| EP | 1415844 A2 | 5/2004 |
| WO | 0002778 A1 | 1/2000 |

OTHER PUBLICATIONS

ISR and WO for PCT/US2013/070412 mailed Feb. 19, 2014.

*Primary Examiner* — Robert Poon
(74) *Attorney, Agent, or Firm* — Quarles & Brady LLP

(57) ABSTRACT

A fuel filler device for filling fuel into a vehicle tank, includes a filler pipe for receiving a fuel filler nozzle, which filler pipe can be connected with the vehicle tank. At least one pivotably mounted closing flap is arranged in the filler pipe. A spring element is provided, which biases the at least one closing flap into a closing position closing a passage through the filler pipe. The at least one closing flap is pivotable from the closing position into an opening position opening a passage through the filler pipe as a result of the fuel filler nozzle inserted into the filler pipe. At least one valve element forms at least one bypass to the at least one closing flap, and from a limit pressure difference, allows a passage of gas out of the filler pipe and/or into the filler pipe.

14 Claims, 2 Drawing Sheets

(51) Int. Cl.
*B60K 15/05* (2006.01)
*B60K 15/03* (2006.01)

(52) U.S. Cl.
CPC ............ *B60K 2015/03256* (2013.01); *B60K 2015/03552* (2013.01); *B60K 2015/0461* (2013.01); *B60K 2015/0474* (2013.01); *B60K 2015/0515* (2013.01)

(58) Field of Classification Search
CPC .......... B60K 2015/03256; B60K 2015/03552; B60K 2015/0461; B60K 2015/0474; B60K 2015/0515; B60K 2015/03528; B60K 2015/03538; B60K 2015/0429; B60K 2015/0445; B67D 7/54
USPC ............................................... 220/86.2, 86.1
See application file for complete search history.

(56) References Cited

U.S. PATENT DOCUMENTS

| | | | |
|---|---|---|---|
| 6,415,827 B1* | 7/2002 | Harris | B60K 15/03519 141/302 |
| 6,691,750 B1* | 2/2004 | Foltz | B60K 15/04 141/350 |
| 6,755,057 B2 | 6/2004 | Foltz | |
| 6,983,773 B1* | 1/2006 | Hagano | B60K 15/04 141/348 |
| 8,220,506 B2* | 7/2012 | Aso | B60K 15/03519 141/302 |
| 10,195,934 B2* | 2/2019 | Bar | B60K 15/03519 |
| 2004/0083779 A1 | 5/2004 | Foltz | |
| 2006/0032549 A1* | 2/2006 | McClung | B60K 15/04 141/97 |
| 2007/0000574 A1* | 1/2007 | DeCapua | B60K 15/04 141/350 |
| 2011/0108563 A1* | 5/2011 | Gerdes | B60K 15/0403 220/810 |
| 2015/0298541 A1 | 10/2015 | Bar et al. | |
| 2016/0031317 A1 | 2/2016 | Giles et al. | |

* cited by examiner

FUEL FILLER DEVICE

RELATED APPLICATIONS

The present application is a Continuation application of U.S. application Ser. No. 14/440,883, filed May 6, 2015, which is a National Stage of PCT/US2013/070412, filed Nov. 15, 2013, which claims priority from Germany Application No. 10 2012 022 393.5, filed Nov. 16, 2012, the entire contents of each application being incorporated herein by reference in their entirety.

TECHNICAL FIELD

The invention relates to a fuel filler device for filling fuel into a vehicle tank, comprising a filler pipe for receiving a fuel filler nozzle, which filler pipe can be connected with the vehicle tank, wherein at least one pivotably mounted closing flap is arranged in the filler pipe, wherein a spring element is provided, which biases the at least one closing flap into a closing position closing a passage through the filler pipe, wherein the at least one closing flap is pivotable from its closing position into an opening position opening a passage through the filler pipe, by the fuel filler nozzle inserted into the filler pipe.

BACKGROUND

For example in the case of what are known as capless fuel filler devices (capless fuel filler systems), for example two closing flaps are pivotably mounted in a filler pipe, one behind the other as viewed in an insertion direction of a fuel filler nozzle. As a rule, the closing flaps are in each case biased by a spring element into a closed position in which they close a passage through the filler pipe for fuel, for example. When the fuel filler nozzle is inserted, it butts by way of its free end firstly against the first closing flap and pivots the latter counter to the spring bias into an open position in which it allows the passage of the fuel filler nozzle. Subsequently, the fuel filler nozzle butts against the second closing flap and pushes the latter, too, counter to the spring bias into an open position in which this second closing flap also allows the passage of the fuel filler nozzle. The vehicle tank can subsequently be filled with fuel via the fuel filler nozzle. After the tank filling process is complete, the fuel filler nozzle is pulled out of the filler pipe again, wherein said fuel filler nozzle initially passes out of the passage opening opened by the second closing flap. The second closing flap thereupon moves back into the closed position on account of its spring bias. Subsequently, the fuel filler nozzle is also pulled out of the passage opened by the first closing flap, and the first closing flap, too, moves back into its closed position on account of its spring bias. Fuel filler devices of this type are also known, which have only one pivotably mounted closing flap in the filler pipe.

As a rule, it is necessary to allow the fuel filler device to be aerated or ventilated, in particular on the vehicle-tank side. Thus, pressure differences between the tank-side interior of the fuel filler device and the exterior, facing the outer environment, of the fuel filler device have to be ensured. To this end, corresponding valves are required which, in the prior art, are integrated into the one or more closing flaps. In particular in the case of capless fuel filler devices, in which thus no outer cap that closes the filler pipe is provided, the closing flaps provide a seal in their closing position with respect to the passage of liquid and gas. The provision of valves for aeration and ventilation is indispensable in such a case.

On account of the valves to be integrated, the closing flaps of the prior art have a complicated structure. Furthermore, in particular when a plurality of closing flaps are provided, it is necessary, in a complicated manner, to equip each of the closure flaps with a corresponding valve. These are then arranged in series and have to be coordinated with one another in a complicated manner for suitable aeration and ventilation.

Proceeding from the explained prior art, the invention is based on the object of providing a fuel filler device of the type mentioned at the beginning, which allows reliable aeration and ventilation in a structurally simple and robust manner.

SUMMARY

The invention achieves the object by way of a fuel filler device for filling fuel into a vehicle tank, comprising a filler pipe for receiving a fuel filler nozzle, which filler pipe can be connected with the vehicle tank, wherein at least one pivotably mounted closing flap is arranged in the filler pipe, wherein a spring element is provided, which biases the at least one closing flap into a closing position closing a passage through the filler pipe, wherein the at least one closing flap is pivotable from its closing position into an opening position opening a passage through the filler pipe, by the fuel filler nozzle inserted into the filler pipe, wherein at least one valve element is provided in the filler pipe, which valve element forms at least one bypass to the at least one closing flap and, from a limit pressure difference, allows a passage of gas out of the filler pipe and/or into the filler pipe.

The fuel filler device according to the invention may be in particular a capless fuel filler device, i.e. no outer closing cap is provided in addition to the closing flap or flaps arranged in the filler pipe. The fuel filler device according to the invention has a very broad range of application. It can be used in principle for capless filler systems, capped filler systems, filler heads, conventional fuel filler nozzle guides, systems with or without a misfueling inhibitor (MFI), fuel filler devices that are capable of being serviced and fuel filler devices that are not capable of being serviced, etc. The fuel filler device according to the invention can also be used in principle for filler pipes made of plastics material or metal. The same applies for conventional funnel concepts.

According to the invention, at least one valve element is provided in the filler pipe, which valve element forms at least one bypass to the at least one closing flap. From a limit pressure difference, the valve element allows aeration and/or ventilation of the fuel filler device. In particular the valve element opens for a passage of gas when a limit pressure difference between the interior space, facing the vehicle tank, of the filler pipe and the exterior space, facing the outer environment, of the filler pipe is achieved. The limit pressure difference can be predetermined in a defined manner by appropriate selection and adjustment of the valve element. Such pressure equalization is required particularly for vehicles which are fueled with gasoline.

According to the invention, the valve element forms a bypass to the at least one closing flap or to the plurality of closing flaps. Thus, in contrast to the prior art, the valve does not have to be integrated into the one or plurality of closing flaps. Rather, the valve can be located in the filler pipe in particular next to the closing flap or next to the closing flaps.

As a result, not only is the structure simplified, but also only one valve is required for aerating and ventilating the vehicle tank, even if more than one closing flap is provided in the filler pipe. This results in a simplification and a particularly robust structure. The closing flaps can be designed to be smaller and the installation space for the entire system can be reduced in size. The aeration and ventilation of the tank is reliably ensured by only one valve even in the case of a fuel filler device having two or more closing flaps. The number of components can be reduced and the coordination of the flow rates through the valve element is simpler. Thus, in particular when two or more closing flaps are provided, it is not necessary to coordinate two or more series-connected valves with one another, as in the prior art. A plurality of valve elements and a plurality of bypasses to the at least one closing flap can also be formed, for example in each case one for equalizing an underpressure in the interior of the fuel filler device and in each case one for equalizing an overpressure in the interior of the fuel filler device.

The spring element that biases the at least one closing flap into the closing position may be for example a spiral spring or leg spring. In the case of a plurality of closing flaps, all or only one or some of the closing flaps can be biased in a corresponding manner.

According to a particularly practical configuration, at least one valve element may be arranged in at least one valve holding section arranged in the filler pipe. Preferably, the valve holding section is arranged at least sectionally next to at least one closing flap, in particular next to a plurality or all of the closing flaps. The valve element is thus arranged parallel to the closing flap or closing flaps in the axial direction of the filler pipe. The valve holding section forms what is known as a valve tower or valve dome. This results in a particularly simple structure in order to realize the bypass according to the invention by way of the valve element.

According to a further embodiment, at least one ring-shaped flange may be provided on which the at least one closing flap abuts in its closing position. The at least one closing flap may also be pivotably mounted on the at least one ring-shaped flange. The pivot bearing may be provided for example on a side of the filler pipe opposite the valve element. In this case, the valve holding section may have the at least one ring-shaped flange. If a plurality of closing flaps are provided, a plurality of ring-shaped flanges may also be provided in a corresponding manner.

According to a further embodiment, the at least one valve holding section may be formed in a pipe section which is inserted into the filler pipe. The pipe section may also have the at least one ring-shaped flange. Furthermore, provision may also be made for the pipe section to be formed in at least two parts, wherein the at least one valve holding section is formed on a first part of the pipe section, and a sealing means is provided between the first part, having the at least one valve holding section, of the pipe section and at least a second part of the pipe section. However, it is also possible for the pipe section to be formed in one part. The pipe section forms a module for a capless fuel filler system which is introduced easily as a prefabricated assembly into the filler pipe and can be fastened therein, for example by way of a welding process or crimping or locking by way of a metal element. The filler pipe may be configured in one or more parts. The valve holding section may be an integral part of the pipe section or be a separate component fastened thereto. It is conceivable to attach the valve holding section both to an upper part and to a lower part of the pipe section or to the filler pipe itself. The valve holding section may likewise be configured in one or more parts.

According to a further embodiment, a sealing means may be provided between the pipe section and the at least one ring-shaped flange. Also, the at least one closing flap may abut sealingly on the at least one ring-shaped flange in its closing position. This ensures the sealing which is required in particular for capless filler systems. Aeration and ventilation, for example in driving operation or when stationary, take place reliably via the valve element or valve elements. The sealing of the valve holding section is in principle conceivable by way of a seal with respect to an upper part or to a lower part of the pipe section or with respect to the filler pipe.

In principle, substantially any desired types of valves are conceivable for the valve element according to the invention. Depending on the limit pressure difference, the valve can open in one or both directions, i.e. in a direction toward the vehicle tank and/or in a direction toward the environment of an automobile equipped with the fuel filler device. For example, the at least one valve element may comprise an overpressure valve and/or an underpressure valve and/or a roll over valve and/or a safety valve. The valve may be a two-way valve or more than two-way valve. Furthermore, the at least one valve element may comprise a nonreturn valve which may in particular be spring preloaded.

As already mentioned, at least one further pivotably mounted closing flap may be arranged in the filler pipe, wherein the closing flaps are arranged behind one another, as seen in the insertion direction of the fuel filler nozzle. A plurality of closing flaps, for example two or more than two, are provided, as likewise already explained, for example in the case of capless filler systems, i.e. when no outer covering cap is provided for the filler pipe. If a plurality of closing flaps are provided, the valve element forms a bypass to all of the closing flaps. Thus, once again, only one valve has to be provided for aeration and ventilation. If a plurality of closing flaps are provided, it is also possible for a plurality of ring-shaped flanges configured according to the invention to be provided, in particular on a pipe section. A closing flap may then abut sealingly on each of the ring-shaped flanges and/or be pivotably mounted thereon. A further spring element may then be provided which biases the at least one further closing flap into its closing position.

BRIEF DESCRIPTION OF THE DRAWINGS

An exemplary embodiment of the invention is explained in more detail in the following text with reference to figures, in which, schematically in each case.

DETAILED DESCRIPTION

Figure 1:
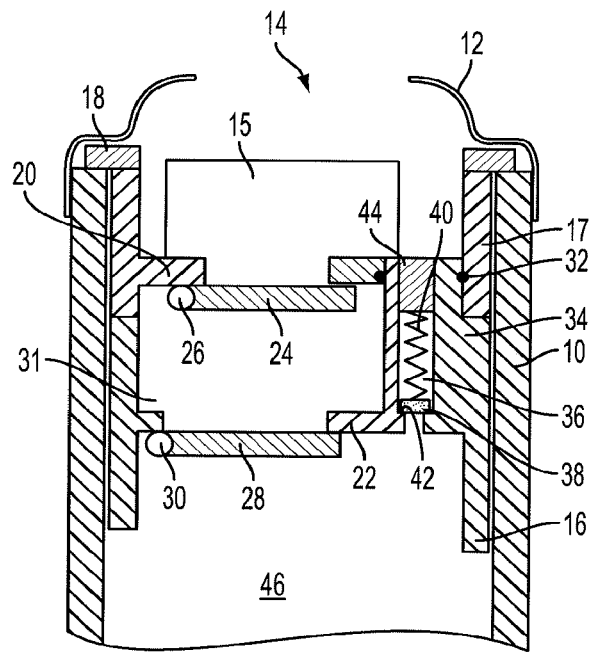
FIG. 1 shows a sectional view of a fuel filler device according to the invention in a first operating state.

Unless stated otherwise, the same reference signs are used to denote identical items in the figures. FIG. 1 shows a fuel filler device according to the invention for filling fuel into a vehicle tank (not shown) of an automobile in a first operating state. The fuel filler device comprises a filler pipe 10 which may consist of plastics material or metal. By way of its lower end (not shown in FIG. 1), the filler pipe 10 is connected to a vehicle tank of an automobile. At its upper end in FIG. 1, an insertion section 12, which forms an insertion opening 14 for a fuel filler nozzle (not shown), is connected to the filler pipe 10. The fuel filler device according to the invention and shown in the figures forms a capless fuel filler system, i.e. no outer cap for closing the insertion opening 14 is provided. The fuel filler device has a misfueling inhibitor which is shown very schematically in the figures at the reference sign 15.

Inserted into the upper end of the filler pipe 10 is a pipe section which is constructed in a multipart manner in the example shown. It has a lower section 16 and an upper section 17. At its upper end in FIG. 1, the upper section 17 of the pipe section has a flange 18, formed integrally therewith, by way of which it rests on the upper end of the filler pipe 10. The pipe section furthermore has, arranged one behind the other as seen in the insertion direction of a fuel filler nozzle, i.e. from top to bottom in FIG. 1, a first ring-shaped flange 20 extending from its inner wall and a second ring-shaped flange 22 likewise extending from its inner wall. While the second ring-shaped flange 22 is formed integrally on the lower section 16 of the pipe section, the first ring-shaped flange 20 is formed integrally on the upper section 17 of the pipe section.

Figure 3:
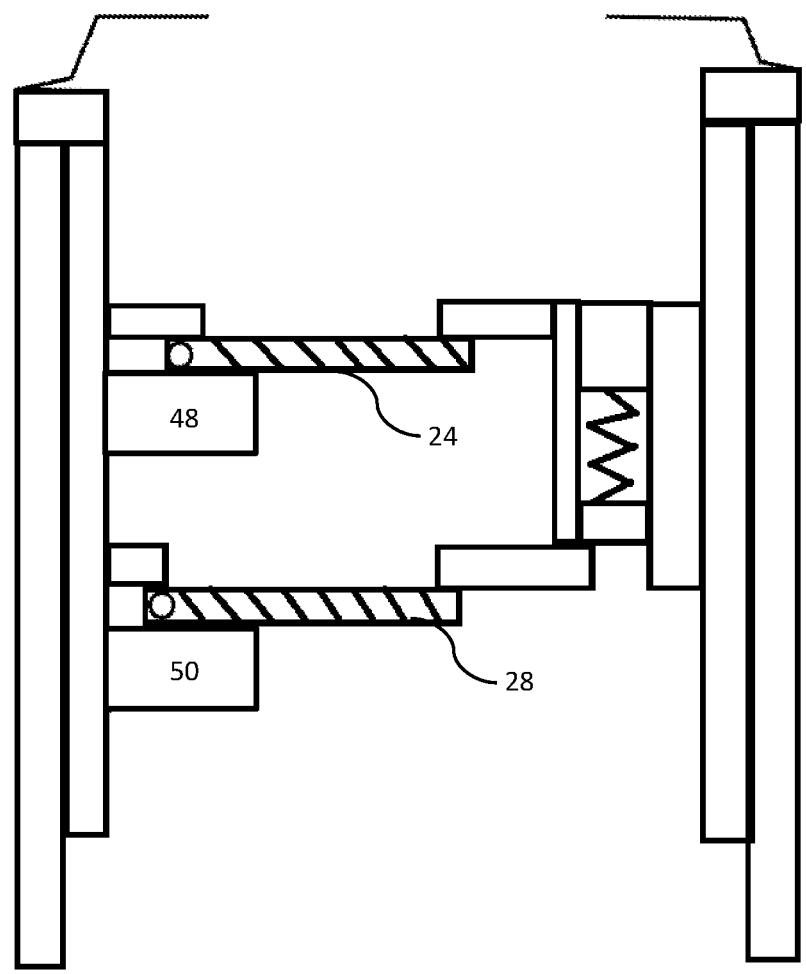
FIG. 3 shows spring elements biasing the flaps of the fuel filler device, respectively.

A first closing flap 24 is pivotably mounted via a pivot bearing 26 on the first ring-shaped flange 20 on its underside facing away from the insertion opening 14. In a corresponding manner, a second closing flap 28 is pivotably mounted via a pivot bearing 30 on the second ring-shaped flange 22 on its underside facing away from the insertion opening 14. The closing flaps 24, 28 are biased into their closing position shown in FIG. 1 via spring elements 48 and 50 (shown in FIG. 3). In this closing position, the closing flaps 24, 28 abut sealingly on the ring-shaped flange 20, 22 respectively assigned to them and close a passage through the ring-shaped flanges 20, 22. An intermediate space 31 is formed between the closing flaps 24, 28 in the closing position shown in FIG. 1.

If a fuel filler nozzle is now introduced into the filler pipe 10 in a manner known per se, said fuel filler nozzle butts by way of its free end first of all against the first closing flap 24 and subsequently the second closing flap 28 and can thus pass through the ring-shaped flanges 20, 22. Subsequently, the fueling operation for the vehicle tank can take place. As soon as this has been concluded, the fuel filler nozzle is pulled out of the filler pipe 10 again, wherein the closing flaps 28, 24 move successively back into their closing position shown in FIG. 1 on account of their spring bias.

A part, forming a valve holding section 34, of the lower section 16 of the pipe section is sealed off from the upper section 17 of the pipe section via a sealing means, for example a sealing ring 32. The valve holding section 34 forms a valve tower or valve dome in which a valve 36, forming a valve element, for aerating and ventilating the vehicle tank is arranged. As can be seen in FIG. 1, the valve holding section 34 with the valve 36 arranged therein forms a bypass to the passage, selectively opened or closed by the closing flaps 24, 28, for a fuel filler nozzle. In particular, the valve holding section is arranged next to the closing flaps 24, 28. The valve 36 has a valve body 38 which is biased by a spring 40 into the closed position shown in FIG. 1, in which the valve body 38 abuts against a valve seat 42. The valve 36 furthermore has, on its side facing the insertion opening 14, a protective cover 44 which prevents the ingress of dust or other contaminants. The valve 36 may be for example an overpressure valve or underpressure valve which, in the present case, opens, from a predetermined limit pressure difference, in a direction from the insertion opening 14 to the tank, i.e. from top to bottom in FIG. 1, and/or in a direction from the tank to the insertion opening, i.e. from bottom to top in FIG. 1.

Figure 2:
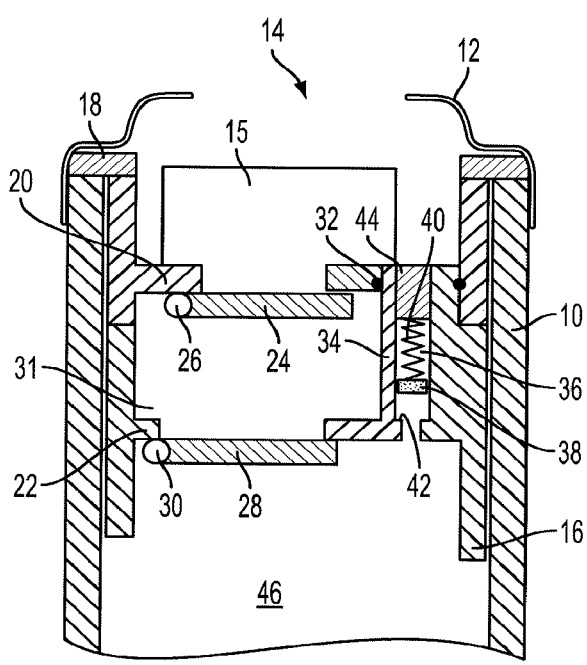
FIG. 2 shows a sectional view of the fuel filler device shown in FIG. 1 in a second operating state.

FIG. 2 shows a second operating state of the fuel filler device according to the invention. In this state, the valve 38 is in an open position. In particular, the valve body 38 is in a position in which it is lifted off the valve seat 42 so that gas can flow through the valve 36 outwardly for example from the interior 46, facing the vehicle tank, of the filler pipe 10 through the insertion opening 14. This is for example the case when an overpressure with respect to the outer environment is prevailing in the interior 46. It is likewise possible for an underpressure, with respect to the outer environment, prevailing in the interior 46 to be equalized by the bypass valve 36 according to the invention in that the valve 36 opens so that gas can flow into the interior 46 from the outside through the insertion opening 14.

As a result of the arrangement of the valve 36 in the valve holding section 34 forming a bypass to the closing flaps 24, 28, even when two closing flaps 24, 28 are present, only one valve 36 is required for aerating and ventilating the vehicle tank. Furthermore, the structure is simplified, the installation space is reduced in size and pressure equalization control is simplified, since, unlike in the prior art, it is not necessary for a plurality of valves connected one behind another in series to be coordinated. As already mentioned, in principle any type of valve is suitable as valve 36, for example overpressure valves, underpressure valves, roll over valves, safety valves, in particular nonreturn valves, etc.

The invention claimed is:

1. Fuel filler device for filling fuel into a vehicle tank, the fuel filler device comprising:
    a filler pipe having an insertion opening, the filler pipe being configured to receive a fuel filler nozzle, the filler pipe also being configured to be connected with the vehicle tank;
    a first flap positioned in the filler pipe configured to open and close a fuel passage through the filler pipe and provide a first seal between the insertion opening and an intermediate space, wherein the fuel filler device is configured to bias the first flap in the closed position, thus closing the passage through the filler pipe;
    a second flap positioned in the filler pipe and configured to open and close the fuel passage through the filler pipe and provide a second seal between the intermediate space and an interior space facing the vehicle tank; and
    at least one bypass route around the intermediate space, the at least one bypass route contained within the filler pipe and having a valve, the valve configured to open when pressure in the interior space is greater than outer environment pressure so gas can flow through the valve from the interior and through the insertion opening.

2. The fuel filler device of claim 1, wherein:
    the first flap is a pivoting flap mounted to a first ring-shaped flange integrally formed with a pipe section; and
    the second flap is a pivoting flap mounted to a second ring-shaped flange integrally formed with the pipe section.

3. The fuel filler device according to claim 2, wherein the first and second flaps are provided one behind the other, as seen in the insertion direction of the fuel filler nozzle.

4. The fuel filler device according to claim 2, wherein the valve is provided in at least one valve holding section provided in the filler pipe.

5. The fuel filler device according to claim 3, wherein at least one ring-shaped flange is fixedly located in the filler pipe on which the first flap abuts in its closing position.

6. The fuel filler device according to claim 5, wherein the first flap is pivotably mounted on the at least one ring-shaped flange.

7. The fuel filler device according to claim 4, wherein the at least one valve holding section is provided on a pipe section which is inserted into the filler pipe.

8. The fuel filler device according to claim 7, wherein the pipe section is comprised of at least two parts, wherein the at least one valve holding section is provided on a first part of the pipe section, and a seal is provided between the first part of the pipe section, comprising the at least one valve holding section, and at least a second part of the pipe section.

9. The fuel filler device according to claim 2, wherein the valve comprises, with respect to pressure downstream of the filler pipe vis-a-vis fuel flow, at least an overpressure valve.

10. The fuel filler device according to claim 2, wherein:
the at least one bypass route is a permanent structural channel around the first flap, the valve being separate from the structure of the first flap.

11. The fuel filler device according to claim 2, wherein the valve comprises, with respect to pressure downstream of the filler pipe vis-a-vis fuel flow, at least an under pressure valve.

12. The fuel filler device according to claim 2, wherein:
the valve is configured to open and close irrespective of a spatial location of the first flap in the closed position.

13. The fuel filler device of claim 1, wherein:
the at least one fluid communication bypass route is a structural channel around the first flap and the second flap.

14. The fuel filler device of claim 1, wherein the fluid communication bypass route includes a valve having a protective cover configured to prevent an ingress of containments, the protective cover facing the insertion opening.

* * * * *